United States Patent [19]
Matsushita et al.

[11] Patent Number: 5,973,030
[45] Date of Patent: Oct. 26, 1999

[54] LIQUID SILICONE RUBBER COMPOSITIONS AND METHODS FOR THE PREPARATION THEREOF

[75] Inventors: Takao Matsushita; Yasumichi Shigehisa; Yuichi Tsuji, all of Chiba Prefecture, Japan

[73] Assignee: Dow Corning Toray Silicon Co., Ltd., Tokyo, Japan

[21] Appl. No.: 08/862,113

[22] Filed: May 22, 1997

[30] Foreign Application Priority Data

May 24, 1996 [JP] Japan ................................. 8-152977

[51] Int. Cl.$^6$ .................................................. C08G 77/04
[52] U.S. Cl. ......................... 523/203; 523/212; 523/213; 524/492; 524/715; 524/720; 524/780; 524/783; 524/786
[58] Field of Search .................. 523/203, 212, 523/213; 524/492, 715, 720, 780, 783, 786

[56] References Cited

U.S. PATENT DOCUMENTS

| | | | |
|---|---|---|---|
| 4,025,485 | 5/1977 | Kodama et al. | 260/37 SB |
| 5,605,955 | 2/1997 | Hirai | 524/588 |
| 5,625,022 | 4/1997 | Onishi | 528/15 |
| 5,688,225 | 11/1997 | Okazaki | 525/478 |
| 5,691,407 | 11/1997 | Azechi | 524/437 |

*Primary Examiner*—Melvyn I. Marquis
*Assistant Examiner*—Mark W. Milstead
*Attorney, Agent, or Firm*—William F. Boley; Jennifer S. Warren

[57] ABSTRACT

Liquid silicone rubber compositions that prior to cure have good fluidity and excellent moldability and that cure into a highly flame retardant silicone rubber with excellent high-voltage electrical insulating properties. The liquid silicone rubber compositions comprise: (A) polyorganosiloxane; (B) fumed silica; (C) surface-treated zinc carbonate powder as afforded by treating the surface of (a) zinc carbonate powder or basic zinc carbonate powder with (b) an organosilicon compound selected from organosilanes, organosilazanes, and organosiloxane oligomers; (D) polyorganohydrogensiloxane; and (E) platinum catalyst. The liquid silicone rubber compositions may further comprise (F) surface treated aluminum hydroxide powder, (G) triazole compound, and (H) a reaction mixture of (d) platinum compound and (e) 3,5-dimethyl-1-hexyn-3-ol.

18 Claims, No Drawings

LIQUID SILICONE RUBBER COMPOSITIONS AND METHODS FOR THE PREPARATION THEREOF

BACKGROUND OF INVENTION

This invention relates to liquid silicone rubber compositions. More particularly, this invention relates to liquid silicone rubber compositions that prior to cure exhibit good fluidity and excellent moldability and that cure to yield highly flame retardant silicone rubbers that exhibit excellent aging resistance and excellent high-voltage electrical properties such as tracking resistance, arc resistance, and erosion resistance.

Inorganic fillers such as silica micropowder, aluminum oxide powder, aluminum hydroxide powder, and quartz powder are blended into silicone rubber compositions used for applications that demand excellent high flame retardancy and electrical insulating properties. These applications are exemplified by anode caps, plug boots, insulators, and flame-retardant electrical wire and cable. Unfortunately, while high loading levels with inorganic filler can enhance the electrical insulating properties, the resulting silicone rubber compositions have very high viscosities and cannot be used in applications where fluidity is required, for example, as in injection molding.

There have also been attempts to improve the flame retardancy of addition reaction-curing liquid silicone rubber compositions based on low-viscosity polyorganosiloxane, inorganic filler, and a platinum catalyst through the addition of various types of flame retardants. This technology, however, requires a major increase in the addition of inorganic filler in the composition in order to obtain satisfactory flame retardancy and mechanical strength. Moreover, the flame-retardant liquid silicone rubber compositions afforded by this technology have such high viscosities that they can no longer be labeled liquid silicone rubber compositions. Specifically, they cannot be used in applications that demand fluidity, such as injection molding. In order to solve these problems, the preparation of enhanced flame-retardant silicone rubber compositions has been pursued by reducing the addition of highly reinforcing, but also highly thickening inorganic filler, such as silica, and replacing this with a selection from low-thickening inorganic fillers, such as inorganic fillers with large particle sizes. However, liquid silicone rubber compositions prepared using this tactic provide heat-cured silicone rubbers that have reduced mechanical strength and as a result have limited application.

The need therefore exists for a liquid silicone rubber composition that prior to cure evidences suitable fluidity and excellent moldability and that cures into highly flame retardant silicone rubber moldings that have high mechanical strength and excellent high-voltage electrical insulating properties.

As a result of extensive investigations directed to solving the problems described above, the inventors have discovered that the above-described problems can be solved by the admixture, in specific proportions, of specific inorganic fillers and specific flame retardants into a particular type of addition reaction-curing liquid silicone rubber composition.

Therefore, the object of the present invention is to provide liquid silicone rubber compositions that prior to cure exhibit suitable fluidity and excellent moldability and that cure to give a highly flame retardant silicone rubber with excellent high-voltage electrical insulating properties and excellent mechanical strength.

SUMMARY OF INVENTION

Liquid silicone rubber compositions that prior to cure have good fluidity and excellent moldability and that cure into a highly flame retardant silicone rubber with excellent high-voltage electrical insulating properties. The liquid silicone rubber compositions comprise: (A) polyorganosiloxane; (B) fumed silica; (C) surface-treated zinc carbonate powder as afforded by treating the surface of (a) zinc carbonate powder or basic zinc carbonate powder with (b) an organosilicon compound selected from organosilanes, organosilazanes, and organosiloxane oligomers; (D) polyorganohydrogensiloxane; and (E) platinum catalyst.

DESCRIPTION OF INVENTION

The present invention is liquid silicone rubber compositions and methods for their preparation. The liquid silicone rubber compositions comprise (A) 100 weight parts polyorganosiloxane having a viscosity at 25° C. of from 100 to 100,000 mPa·s and the average unit formula

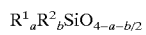

$$R^1{}_aR^2{}_bSiO_{4-a-b/2}$$

where $R^1$ represents monovalent hydrocarbon groups that are free of aliphatically unsaturated bonding, $R^2$ represents aliphatically unsaturated hydrocarbon groups, a has a value from 1.90 to 2.05, b has a value from 0.0005 to 0.1, and a+b has a value of 1.91 to 2.06;

(B) 1 to 60 weight parts fumed silica with a specific surface area of at least 50 $m^2/g$;

(C) 1 to 200 weight parts surface-treated zinc carbonate powder as afforded by treating the surface of (a) zinc carbonate powder or basic zinc carbonate powder with (b) an organosilicon compound selected from the group consisting of organosilanes, organosilazanes, organosiloxane oligomers, and mixtures of the preceding;

(D) polyorganohydrogensiloxane comprising at least 2 silicon-bonded hydrogen atoms in each molecule, in a quantity that affords a value from 0.5:1 to 20:1 for the ratio of the number of moles of silicon-bonded hydrogen to the number of moles of silicon-bonded aliphatically unsaturated hydrocarbon groups in component (A);

and (E) platinum catalyst in a catalytic quantity.

The liquid silicone rubber composition afforded by the addition to the above-described composition comprising components (A) to (E) can further comprise (F) 1 to 200 weight parts surface-treated aluminum hydroxide powder obtained by treating the surface of (c) aluminum hydroxide powder with (b) an organosilicon compound selected from the group consisting of organosilanes, organosilazanes, organosiloxane oligomers, and mixtures of the preceding;

and the liquid silicone rubber composition afforded by the addition to the above-described composition comprising components (A) to (E) or (A) to (F) further comprising (G) 0.001 to 1 weight part triazole compound and (H) the reaction mixture of (d) a platinum compound and (e) 3,5-dimethyl-1-hexyn-3-ol, at 1 to 1,000 weight parts as platinum metal for each 1,000,000 weight parts component (A).

To explain the preceding in greater detail, component (A) is the base component of the present composition. $R^1$ in the formula given above represents monovalent hydrocarbon groups that are free of aliphatically unsaturated bonding, for example, phenyl and alkyl such as methyl, ethyl, propyl, butyl, and octyl. $R^2$ represents aliphatically unsaturated hydrocarbon groups and is exemplified by alkenyl groups such as vinyl and allyl. The subscript a has a value from 1.90 to 2.05; the subscript b has a value from 0.0005 to 0.1; and a+b has a value from 1.91 to 2.06. The polyorganosiloxane will ordinarily have a straight-chain molecular structure, but may be branched to some extent. The aliphatically unsaturated hydrocarbon group can be bonded at terminal or non-terminal position on the molecular chain or at both positions, but is preferably present at least at both molecular chain terminals based on considerations of the post-cure mechanical properties. The aliphatically unsaturated hydrocarbon group may consist of only a single specific type of aliphatically unsaturated hydrocarbon group or may be a mixture of 2 or more specific types of such groups. The viscosity of polyorganosiloxane (A) at 25° C. should be from 100 to 100,000 mPa·s and preferably is from 100 to 50,000 mPa·s. Lower viscosities cause a decline in the mechanical strength, while higher viscosities cause the corresponding liquid silicone rubber composition to have an excessively high viscosity and thus a diminished flowability.

Component (A) is specifically exemplified by vinyldimethylsiloxy-endblocked polydimethylsiloxanes, vinyldimethylsiloxy-endblocked dimethylsiloxane-vinylmethylsiloxane copolymers, and vinyldimethylsiloxy-endblocked dimethylsiloxane-methylphenylsiloxane copolymers.

The fumed silica (B), which is a reinforcing filler, is the component that functions to impart mechanical strength to the present compositions. The fumed silica must have a specific surface area of at least 50 m²/g. Component (B) is added at from 1 to 60 weight parts per 100 weight parts component (A) and is preferably added at from 10 to 40 weight parts per 100 weight parts component (A). The basis for this range is as follows: the addition of too little of component (B) will fail to impart a high mechanical strength, while the addition of too much will cause the compositions to have an excessively high viscosity and thus suffer from a loss of the fluidity that is a characteristic of liquid silicone rubbers. Component (B) is preferably a hydrophobic fumed silica as afforded by surface treatment with, for example, organosilane, organosilazane, or organosiloxane oligomer, since this affords improved mechanical strength and tear strength.

The surface-treated zinc carbonate powder (C) is an essential component in the present invention. The admixture of this component makes it possible to obtain pre-cure fluidity and to generate a cured product with excellent flame retardancy and excellent high-voltage electrical insulating properties such as tracking resistance, erosion resistance, and arc resistance. The zinc carbonate powder or basic zinc carbonate powder (a) encompassed by component (C) preferably has a particle size in the range from 0.1 to 100 µm and more particularly in the range from 0.1 to 50 µm. Component (b) is exemplified by organosilanes that contain a silicon-bonded hydrolyzable group, such as methyltrimethoxysilane, methyltriethoxysilane, phenyltrimethoxysilane, ethyltrimethoxysilane, n-propyltrimethoxysilane, vinyltrimethoxysilane, vinyltriacetoxysilane, allyltrimethoxysilane, butenyltrimethoxysilane, hexenyltrimethoxysilane, γ-methacryloxypropyltrimethoxysilane, dimethyldimethoxysilane, dimethyldiethoxysilane, diphenyldimethoxysilane, trimethylmethoxysilane, trimethylethoxysilane, and vinyltriacetoxysilane; by organosilazanes such as hexamethyldisilazane and divinyltetramethyldisilazane; by diorganosiloxane oligomers bearing silanol, silicon-bonded alkenyl, or silicon-bonded alkoxy; by the partial hydrolysis condensates of the above-mentioned organosilanes; and by branched polyorganosiloxane oligomers containing the $RSiO_{1.5}$ unit (T unit) and/or $SiO_2$ unit (Q unit) and also silanol, silicon-bonded alkenyl, or silicon-bonded alkoxy, where R represents a monovalent hydrocarbon group. Due to the treatment of the surface of the (a) zinc carbonate powder or basic zinc carbonate powder with (b) organosilicon compound selected from the group consisting of organosilanes, organosilazanes, organosiloxane oligomer, and mixtures thereof, the instant component (C) avoids the viscosity increase that is associated with high loadings of a non-surface-treated component (a). Moreover, while a defective cure can be caused in addition reaction-curing liquid silicone rubber compositions by high loadings of a non-surface-treated component (a), the present component (C) will not cause a defective cure as a consequence of the surface treatment of component (a) with component (b). Component (C) is prepared simply by mixing component (b) into component (a) using a mixer. The treatment temperature for this procedure will ordinarily be in the range from 50° C. to 200° C. However, liquid silicone rubber base compounds of the present liquid silicon rubber compositions can also be prepared by adding components (a) and (b) to component (A) and mixing while heating in order thereby to treat the surface of component (a). Component (C) is added at from 1 to 200 weight parts and preferably at from 10 to 120 weight parts, in each case per 100 weight parts component (A). The basis for this range is as follows: the addition of too little of component (C) fails to produce an acceptable flame retardancy and acceptable high-voltage electrical insulating properties, while additions in excess of 200 weight parts risk a substantial increase in the viscosity of the present compositions and a reduction in mechanical strength. The sum of the additions of components (C) and (B) is preferably from 20 to 160 weight parts.

The polyorganohydrogensiloxane (D) is a crosslinker for the present compositions. The present compositions are crosslinked and thereby cured by the addition reaction of the silicon-bonded hydrogen in component (D) with the silicon-bonded alkenyl in component (A) in the presence of the platinum catalyst (E). This polyorganohydrogensiloxane (D) must contain at least 2 silicon-bonded hydrogen atoms in each molecule. Its non-hydrogen silicon-bonded organic groups are exemplified by alkyl such as methyl, ethyl, and propyl; aryl such as phenyl and tolyl; and substituted alkyl such as 3,3,3-trifluoropropyl and 3-chloropropyl.

Component (D) can have a straight-chain, branch-containing straight-chain, cyclic, or network molecular structure. The molecular weight of component (D) is not critical, but the viscosity at 25° C. is preferably from 3 to 10,000 mPa·s. Component (D) is added in a quantity that will provide a value from 0.5:1 to 20:1 and preferably from 1:1 to 3:1 for the ratio of the number of moles of silicon-bonded hydrogen in the present composition to the number of moles of silicon-bonded aliphatically unsaturated hydrocarbon groups provided by component (A). The present compositions will not undergo an acceptable cure when this molar ratio is below 0.5. A molar ratio in excess of 20 can result in foaming.

The platinum catalyst (E) is a curing catalyst for the present compositions. The platinum catalyst is exemplified by chloroplatinic acid, alcohol-solutions of chloroplatinic acid, chloroplatinic acid/olefin complexes, chloroplatinic acid/divinylsiloxane complexes, platinum black, platinum, and supported platinum. Although the addition of component (E) cannot be rigorously specified because it will vary as a function of the type of platinum catalyst, generally the addition will be from 1 to 1,000 weight parts as platinum metal and is preferably from 5 to 100 weight parts as platinum metal, in each case per 1,000,000 weight parts component (A).

The surface-treated aluminum hydroxide powder (F) has the same role as component (C). In particular, through its combined use with component (C) it functions to provide the cured products of the present compositions with improved flame retardancy and high-voltage electrical insulating properties. The aluminum hydroxide powder (c) encompassed by component (F) preferably has a particle size from 0.1 to 50 μm and more preferably from 0.1 to 10 μm. The component (b) encompassed by component (F) is the same as the component (b) used for component (C). Because the surface of the aluminum hydroxide powder (c) has been treated with component (b), component (F) avoids the viscosity increase in liquid silicone rubber compositions that is associated with high loadings of component (A) with a non-surface-treated aluminum hydroxide powder. Component (F) is prepared by treating the surface of component (c) with component (b) by mixing a component (b) as described above into a component (c) as described above using a mixer. The treatment temperature in this procedure is preferably in the range from 50° C. to 200° C. and more preferably is in the range from 80° C. to 180° C. In addition, the preparation of the liquid silicone rubber base compounds can be carried out by mixing components (c) and (b) into component (A) while heating, where the ratio of component (b) to (c) is preferably from 0.1 to 30 weight %. Component (F) is added at from 1 to 200 weight parts and preferably at from 10 to 120 weight parts, in each case per 100 weight parts component (A).

In the case of component (F) addition, the sum of the additions of components (B), (C), and (F) is preferably from 30 to 300 weight parts and more preferably from 40 to 180 weight parts, in each case per 100 weight parts component (A).

The triazole compound (G) is by itself without effect, but it functions to induce improvements in the flame retardancy and high-voltage electrical insulating properties when used in combination with components (C) and (F), as described above, and in particular when used in combination with component (H), as described above. The triazole compound (G) is exemplified by benzotriazole, 1,2,3-triazole, 1,2,4-triazole, and their derivatives. Since this component has a high melting point, its uniform dispersion in the silicone rubber compositions is advantageously effected by dissolving in an organic solvent such as ethanol, isopropyl alcohol, benzene, toluene, and xylene. Component (G) is added at from 0.001 to 1 weight part per 100 weight parts component (A).

Component (H), which is the reaction mixture of (d) a platinum compound and (e) 3,5-dimethyl-1-hexyn-3-ol, provides additional improvements in the flame retardancy of the present compositions. As used herein, the reaction mixture of (d) a platinum compound and (e) 3,5-dimethyl-1-hexyn-3-ol denotes the reaction product generated by the reaction of these two species as well as the mixtures of such a reaction product with its 3,5-dimethyl-1-hexyn-3-ol and platinum compound precursors. The platinum compound is exemplified by chloroplatinic acid, the potassium and sodium salts of chloroplatinic acid, chloroplatinic acid/olefin complexes, and chloroplatinic acid/alkenylsiloxane complexes. The component (d) to component (e) weight ratio preferably falls in the range from 1:0.1 to 1:100 and more preferably in the range from 1:1 to 1:50. The use of quantities that provide more moles component (e) than moles component (d) is also preferred. Component (H) is added in a quantity that affords from 1 to 1,000 weight parts and preferably from 10 to 200 weight parts platinum metal, in each case per 1,000,000 weight parts component (A). No functional effect is manifested by this component at below 1 weight part, while no significant additional effects are observed for additions in excess of 1,000 weight parts.

The present compositions can be prepared simply by mixing components (A) to (E), (A) to (F), (A) to (G), or (A) to (H) to homogeneity in their prescribed quantities. In a preferred method, a liquid silicone rubber base compound is first prepared by mixing together components (A), (B), and (C) or (A), (B), (C), and (F) followed by the admixture of components (D) and (E) and possibly also (G) and (H) into the liquid silicone rubber base compound. In another preferred procedure, components (A), (B), (a), and (b) or (A), (B), (a), (b), and (c) are first mixed together with heating to give a liquid silicone rubber base compound and components (D) and (E) and possibly also components (G) and (H) are then mixed into this liquid silicone rubber base compound. The heating temperature in this procedure will as a general rule be from 50° C. to 200° C. and is preferably from 80° C. to 200° C.

Since the present compositions will gradually cure even at room temperature, use life may be improved by the addition of a known addition reaction inhibitor, for example, ethynylcyclohexanol, dimethylformamide, triphenylphosphine, cyclic vinylmethylsiloxanes, 3-methyl-1-butyn-3-ol, 3,5-dimethyl-1-hexyn-3-ol, cyclohexylbutynol, 3-phenyl-1-butyn-3-ol, diphenylethynylcarbinol, and 3,5-dimethyl-3-hexen-1-yne.

The present compositions may as necessary also contain those additives known for admixture in liquid silicone rubber compositions. These additives are exemplified by reinforcing fillers other than fumed silica, semi-reinforcing fillers, non-reinforcing fillers, flame-retardants, heat stabilizers, pigments, and adhesion promoters.

The present liquid silicone rubber compositions comprising components (A) to (E) or (A) to (F) or (A) to (H) and in particular because they comprise component (C) or components (C) and (F) or components (C), (F), (G), and (H), exhibit good fluidity, excellent moldability, and cure to give highly flame retardant silicone rubbers with excellent aging resistance, high mechanical property values, and excellent high-voltage electrical properties such as tracking resistance, arc resistance, and erosion resistance.

The present invention will be further explained below using working examples, in which "parts" denotes "weight parts" and the values reported for the viscosity of the polyorganosiloxanes and liquid silicone rubber compositions were measured at 25° C. using a rotary viscometer.

The physical properties of silicone rubber moldings were measured by the methods specified in JIS K 6301.

Flame retardancy of silicone rubber moldings was measured as follows. A silicone rubber molding obtained by heat-curing the silicone rubber composition was cut to give a test specimen with a length of 130 mm, width of 13 mm, and thickness of 1 mm. The test specimen was suspended vertically in still air and was ignited by exposure for 10 seconds to a Bunsen burner flame (11-mm flame width, 20-mm inner flame height, 40-mm outer flame height) by just contacting the bottom edge of the test specimen with the top of the inner flame. The Bunsen burner was then withdrawn from the test specimen and the time in seconds was measured until extinction of the flame ignited on the test specimen. This flame retardancy test was run twice on each of 5 test specimens and the average (seconds) of the 10 measurements is reported as the flame retardancy data.

High-voltage electrical insulating properties were measured using an inclined plane anti-tracking test run according to International Electrotechnical Commission (IEC) Publication 587. The test instrument was a model HAT-520 from Hitachi Kasei Kogyo Kabushiki Kaisha. The test voltage was 3.5 kV. The criterion A referenced in the measurement results refers to the time in minutes required until the current flowing in a high-voltage circuit passing through the test specimen exceeded 60 mA for 2 seconds. The criterion B referenced in the test results refers to the time in minutes for the track to reach a mark on the surface of the test specimen 25 mm from the lower electrode. The erosion was visually inspected and was scored on a three-level scale (small, moderate, big).

EXAMPLE 1.

The following were mixed to homogeneity: 100 parts vinyldimethylsiloxy-endblocked polydimethylsiloxane with a viscosity of 10,000 mPa·s, 18 parts fumed silica with a specific surface area of 200 $m^2/g$, 65 parts zinc carbonate powder with an average particle size of 10 $\mu$m, and, as surface-treatment agent, 2 parts hexamethyldisilazane and 0.6 part water. This mixture was heated for 1 hour at 170° C. in a vacuum to give a liquid silicone rubber base compound. After cooling, the following were then mixed to homogeneity into the liquid silicone rubber base compound to give a liquid silicone rubber composition: 1.4 parts trimethylsiloxy-endblocked dimethylsiloxane-methylhydrogensiloxane copolymer with a silicon-bonded hydrogen content of 0.7 weights and, as curing catalyst, chloroplatinic acid in a quantity providing 10 ppm platinum metal. The liquid silicone rubber composition was press-cured in a mold by heating at 150° C. for 5 minutes to yield a silicone rubber sheet. The physical properties, flame retardancy, and high-voltage electrical properties of this silicone rubber sheet were measured and the results are reported in Table 1.

EXAMPLE 2.

The following were mixed to homogeneity: 100 parts vinyldimethylsiloxy-endblocked polydimethylsiloxane with a viscosity of 10,000 mPa·s, 18 parts fumed silica with a specific surface area of 200 $m^2/g$, 65 parts zinc carbonate powder with an average particle size of 10 $\mu$m, and, as surface-treatment agent, 2 parts dimethylhydroxysiloxy-endblocked dimethylsiloxane oligomer. This mixture was heated for 1 hour at 170° C. in a vacuum to give a liquid silicone rubber base compound. After cooling, the following were then mixed to homogeneity into this liquid silicone rubber base compound to give a liquid silicone rubber composition: 1.4 parts trimethylsiloxy-endblocked dimethylsiloxane-methylhydrogensiloxane copolymer with a silicon-bonded hydrogen content of 0.7 weight % and, as curing catalyst, chloroplatinic acid in a quantity providing 10 ppm platinum metal. The liquid silicone rubber composition was press-cured by heating in a mold at 150° C. for 5 minutes to yield a silicone rubber sheet. The physical properties, flame retardancy, and high-voltage electrical properties of this silicone rubber sheet were measured, and these results are reported in Table 1.

EXAMPLE 3.

The following were mixed to homogeneity: 100 parts vinyldimethylsiloxy-endblocked polydimethylsiloxane with a viscosity of 10,000 mpa·s, 18 parts fumed silica with a specific surface area of 200 $m^2/g$, and, as surface-treatment agent, 2 parts hexamethyldisilazane and 0.6 part water. This mixture was heated for 1 hour at 170° C. under vacuum to give a liquid silicone rubber base compound. The liquid silicone rubber base compound was then mixed to homogeneity with 65 parts of a surface-treated zinc carbonate powder (surface-treated with dimethylhydroxysiloxy-endblocked dimethylsiloxane oligomer) to give a second liquid silicone rubber base compound. After cooling, the following were mixed to homogeneity into this second liquid silicone rubber base compound to give a liquid silicone rubber composition: 1.4 parts trimethylsiloxy-endblocked dimethylsiloxane-methylhydrogensiloxane copolymer with a silicon-bonded hydrogen content of 0.7 weight % and, as curing catalyst, chloroplatinic acid in a quantity providing 10 ppm platinum metal. The liquid silicone rubber composition was press-cured by heating in a mold at 150° C. for 5 minutes to yield a silicone rubber sheet. The physical properties, flame retardancy, and high-voltage electrical insulating properties of this silicone rubber sheet were measured, and the results are reported in Table 1.

Comparative Example 1.

The following were mixed to homogeneity: 100 parts vinyldimethylsiloxy-endblocked polydimethylsiloxane with a viscosity of 10,000 mPa·s, 18 parts fumed silica with a specific surface area of 200 $m^2/g$, and, as surface-treatment agent, 2 parts hexamethyldisilazane and 0.6 part water. This mixture was heated for 1 hour at 170° C. under vacuum to give a liquid silicone rubber base compound. The liquid silicone rubber base compound was then mixed with 65 parts zinc carbonate powder (average particle size=10 $\mu$m) to give a second liquid silicone rubber base compound. After cooling, the following were mixed to homogeneity into this second liquid silicone rubber base compound to give a liquid silicone rubber composition: 1.4 parts trimethylsiloxy-endblocked dimethylsiloxane-methylhydrogensiloxane copolymer with a silicon-bonded hydrogen content of 0.7 weight % and, as curing catalyst, chloroplatinic acid in a quantity providing 10 ppm platinum metal. When this liquid silicone rubber composition was press-cured by heating in a mold at 150° C. for 5 minutes in order to prepare a silicone rubber sheet, the silicone rubber sheet could not be obtained due to severe cure inhibition.

EXAMPLE 4.

The following were mixed to homogeneity: 100 parts vinyldimethylsiloxy-endblocked polydimethylsiloxane with a viscosity of 10,000 mpa·s, 18 parts fumed silica with a specific surface area of 200 $m^2/g$, 15 parts zinc carbonate powder with an average particle size of 10 $\mu$m, 50 parts aluminum hydroxide powder with an average particle size of 1 $\mu$m, and, as surface-treatment agent, 2 parts hexamethyldisilazane, 0.6 part water, and 2 parts dimethylhydroxysiloxy-endblocked dimethylsiloxane oligomer. This mixture was heated for 1 hour at 170° C. under vacuum to give a liquid silicone rubber base compound. After cooling, the liquid silicone rubber base compound was mixed to homogeneity with the following to give a liquid silicone rubber composition: 1.4 parts trimethylsiloxy-endblocked dimethylsiloxane-methylhydrogensiloxane copolymer with a silicon-bonded hydrogen content of 0.7 weight % and, as curing catalyst, chloroplatinic acid in a quantity providing 10 ppm platinum metal. The liquid silicone rubber composition was press-cured by heating in a mold at 150° C. for 5 minutes to yield a silicone rubber sheet. The physical properties, flame retardancy, and high-voltage electrical insulating properties of this silicone rubber sheet were measured, and these results are reported in Table 2.

EXAMPLE 5.

The following were mixed to homogeneity: 100 parts vinyldimethylsiloxy-endblocked polydimethylsiloxane with a viscosity of 10,000 mPa·s, 18 parts fumed silica with a specific surface area of 200 $m^2/g$, and, as surface-treatment agent, 2 parts hexamethyldisilazane and 0.6 part water. This mixture was heated for 1 hour at 170° C. in a vacuum to give a liquid silicone rubber base compound. After cooling, this liquid silicone rubber base compound was then mixed to homogeneity with 15 parts surface-treated zinc carbonate powder and 50 parts surface-treated aluminum hydroxide powder (surfaces treated with 2 parts dimethylhydroxysiloxy-endblocked dimethylsiloxane oligomer) to give a second liquid silicone rubber base compound. The following were mixed to homogeneity into this second liquid silicone rubber base compound to give a liquid silicone rubber composition: 1.4 parts trimethylsiloxy-endblocked dimethylsiloxane-methylhydrogensiloxane copolymer with a silicon-bonded hydrogen content of 0.7 weight % and, as curing catalyst, chloroplatinic acid in a quantity providing 10 ppm platinum metal. The liquid silicone rubber composition was press-cured by heating at 150° C. in a mold for 5 minutes to yield a silicone rubber sheet. The physical properties, flame retardancy, and high-voltage electrical insulating properties of the silicone rubber sheet were measured, and these results are reported in Table 2.

Comparative Example 2.

The following were mixed to homogeneity: 100 parts vinyldimethylsiloxy-endblocked polydimethylsiloxane with a viscosity of 10,000 mPa·s, 18 parts fumed silica with a specific surface area of 200 $m^2/g$, and, as surface-treatment agent, 2 parts hexamethyldisilazane and 0.6 part water. This mixture was heated for 1 hour at 170° C. in a vacuum to give a liquid silicone rubber base compound. After cooling, the liquid silicone rubber base compound was mixed to homogeneity with 15 parts zinc carbonate powder (average particle size=10 $\mu$m) and 50 parts aluminum hydroxide powder (average particle size=1 $\mu$m) to give a second liquid silicone rubber base compound. The following were mixed to homogeneity into this second liquid silicone rubber base compound to give a liquid silicone rubber composition: 1.4 parts trimethylsiloxy-endblocked dimethylsiloxane-methylhydrogensiloxane copolymer with a silicon-bonded hydrogen content of 0.7 weight % and, as curing catalyst, chloroplatinic acid in a quantity providing 10 ppm platinum metal. When this liquid silicone rubber composition was press-cured by heating in a mold at 150° C. for 5 minutes in order to prepare a silicone rubber sheet, a good-quality silicone rubber sheet could not be obtained due to cure inhibition and foaming.

EXAMPLE 6.

The following were mixed to homogeneity into a liquid silicone rubber base compound prepared as in Example 4 to give a liquid silicone rubber composition: 1.4 parts trimethylsiloxy-endblocked dimethylsiloxane-methylhydrogensiloxane copolymer with a silicon-bonded hydrogen content of 0.7 weight %, chloroplatinic acid as curing catalyst in a quantity providing 10 ppm platinum metal, 0.1 part benzotriazole, and 0.8 part (corresponding to 30 ppm as platinum metal) of a reaction mixture of 3,5-dimethyl-1-hexyn-3-ol and a chloroplatinic acid/divinyltetramethyldisiloxane complex. The liquid silicone rubber composition was press-cured by heating in a mold at 150° C. for 5 minutes to yield a silicone rubber sheet. The above-mentioned reaction mixture was prepared by mixing 500 parts 3,5-dimethyl-1-hexyn-3-ol into 100 parts of a chloroplatinic acid/divinyltetramethyldisiloxane complex. The physical properties, flame retardancy, and high-voltage electrical insulating properties of this silicone rubber sheet were measured, and the results are reported in Table 3.

EXAMPLE 7.

The following were mixed to homogeneity into a liquid silicone rubber base compound prepared as in Example 5 to give a liquid silicone rubber composition: 1.4 parts trimethylsiloxy-endblocked dimethylsiloxane-methylhydrogensiloxane copolymer with a silicon-bonded hydrogen content of 0.7 weight %, chloroplatinic acid as curing catalyst in a quantity providing 10 ppm platinum metal, 0.1 part benzotriazole, and 0.8 part (corresponding to 30 ppm as platinum metal) of a reaction mixture as described in Example 6 of 3,5-dimethyl-1-hexyn-3-ol and a chloroplatinic acid/divinyltetramethyldisiloxane complex. The liquid silicone rubber composition was press-cured by heating in a mold at 150° C. for 5 minutes to yield a silicone rubber sheet. The physical properties, flame retardancy, and high-voltage electrical insulating properties of the silicone rubber sheet were measured, and the results are reported in Table 3.

TABLE 1

| | Example 1 | Example 2 | Example 3 | Comp. Example 1 |
|---|---|---|---|---|
| composition | | | | |
| dimethylvinylsiloxy-endblocked dimethylpolysiloxane (parts) | 100 | 100 | 100 | 100 |
| fumed silica (parts) | 18 | 18 | 18 | 18 |
| zinc carbonate powder (parts) | 65 | 65 | | 65 |
| surface-treated zinc carbonate powder (parts) | | | 65 | |
| hexamethyldisilazane/water (parts) | 2/0.6 | | | |
| dimethylhydroxysiloxy-endblocked dimethylsiloxane oligomer (parts) | | 2 | | |
| trimethylsiloxy-endblocked dimethylsiloxane/methyl-hydrogensiloxane copolymer (parts) | 1.4 | 1.4 | 1.4 | 1.4 |
| chloroplatinic acid (ppm: platinum metal) | 10 | 10 | 10 | 10 |
| composition viscosity (poise) | 1500 | 1800 | 2000 | 10000 |
| physical properties | | | | |
| durometer (JIS-A) | 32 | 30 | 30 | — |
| tensile strength (kg/$cm^2$) | 30 | 27 | 26 | — |
| elongation (%) | 750 | 760 | 780 | — |
| tear strength A (kg/cm) | 7 | 6 | 5 | — |
| flame retardancy (seconds) | 67 | 62 | 65 | — |
| high-voltage electrical insulating properties | | | | |
| criterion A (minutes) | 360 | 360 | 360 | — |
| criterion B (minutes) | 266 | 257 | 250 | — |
| erosion | moderate | moderate | moderate | — |

TABLE 2

|  | Example 4 | Example 5 | Comp. Example 2 |
|---|---|---|---|
| composition |  |  |  |
| dimethylvinylsiloxy-endblocked dimethylpolysiloxane (parts) | 100 | 100 | 100 |
| fumed silica (parts) | 18 | 18 | 18 |
| zinc carbonate powder (parts) | 15 |  | 15 |
| surface-treated zinc carbonate powder (parts) |  | 15 |  |
| aluminum hydroxide powder (parts) | 50 |  | 50 |
| surface-treated aluminum hydroxide powder (parts) |  | 50 |  |
| hexamethyldisilazane/water (parts) | 2/0.6 |  |  |
| dimethylhydroxysiloxy-endblocked dimethylsiloxane oligomer (parts) |  | 2 |  |
| trimethylsiloxy-endblocked dimethylsiloxane/methylhydrogensiloxane copolymer (parts) | 1.4 | 1.4 | 1.4 |
| chloroplatinic acid (ppm: platinum metal) | 10 | 10 | 10 |
| composition viscosity (poise) | 2000 | 2000 | 12000 |
| physical properties |  |  |  |
| durometer (JIS-A) | 34 | 32 | — |
| tensile strength (kg/cm$^2$) | 40 | 38 | — |
| elongation (%) | 740 | 750 | — |
| tear strength A (kg/cm) | 12 | 11 | — |
| flame retardancy (seconds) | 29 | 30 | — |
| high-voltage electrical insulating properties |  |  |  |
| criterion A (minutes) | 360 | 360 | — |
| criterion B (minutes) | 348 | 340 | — |
| erosion | moderate | moderate | — |

TABLE 3

|  | Example 6 | Example 7 |
|---|---|---|
| composition |  |  |
| dimethylvinylsiloxy-endblocked dimethylpolysiloxane (parts) | 100 | 100 |
| fumed silica (parts) | 18 | 18 |
| zinc carbonate powder (parts) | 15 |  |
| surface-treated zinc carbonate powder (parts) |  | 15 |
| aluminum hydroxide powder (parts) | 50 |  |
| surface-treated aluminum hydroxide powder (parts) |  | 50 |
| hexamethyldisilazane/water (parts) | 2/0.6 |  |
| dimethylhydroxysiloxy-endblocked dimethylsiloxane oligomer (parts) |  | 2 |
| trimethylsiloxy-endblocked dimethylsiloxane/methylhydrogensiloxane copolymer (parts) | 1.4 | 1.4 |
| chloroplatinic acid (ppm: platinum metal) | 10 | 10 |
| benzotriazole (parts) | 0.1 | 0.1 |
| reaction mixture (parts) | 0.8 | 0.8 |
| composition viscosity (poise) | 2000 | 2000 |
| physical properties |  |  |
| durometer (JIS-A) | 34 | 32 |
| tensile strength (kg/cm$^2$) | 40 | 38 |
| elongation (%) | 740 | 750 |
| tear strength A (kg/cm) | 12 | 11 |
| flame retardancy (seconds) | 2 | 3 |
| high-voltage electrical insulating properties |  |  |
| criterion A (minutes) | 360 | 360 |
| criterion B (minutes) | 360 | 360 |
| erosion | small | small |

We claim:

1. A liquid silicone rubber composition comprising
  (A) 100 weight parts polyorganosiloxane having a viscosity at 25° C. of from 100 to 100,000 mPa·s and average unit formula $$R^1_a R^2_b SiO_{4-a-b/2}$$

where $R^1$ represents monovalent hydrocarbon groups that are free of aliphatically unsaturated bonding, $R^2$ represents aliphatically unsaturated hydrocarbon groups, a has a value from 1.90 to 2.05, b has a value from 0.0005 to 0.1, and a+b has a value of 1.91 to 2.06;
  (B) 1 to 60 weight parts fumed silica with a specific surface area of at least 50 m$^2$/g;
  (C) 1 to 200 weight parts surface-treated zinc carbonate powder as afforded by treating the surface of
    (a) zinc carbonate powder with
    (b) an organosilicon compound selected from the group consisting of organosilanes, organosilazanes, organosiloxane oligomers, and mixtures of the preceding;
  (D) a polyorganohydrogensiloxane comprising at least 2 silicon-bonded hydrogen atoms in each molecule, in a quantity that affords a value from 0.5:1 to 20:1 for the ratio of the number of moles of silicon-bonded hydrogen to the number of moles of silicon-bonded aliphatically unsaturated hydrocarbon groups in component (A);
and
  (E) platinum catalyst in a catalytic quantity.

2. A liquid silicone rubber composition comprising
  (A) 100 weight parts polyorganosiloxane having a viscosity at 25° C. of from 100 to 100,000 mPa·s and average unit formula $$R^1_a R^2_b SiO_{4-a-b/2}$$

where $R^1$ represents monovalent hydrocarbon groups that are free of aliphatically unsaturated bonding, $R^2$ represents aliphatically unsaturated hydrocarbon groups, a has a value from 1.90 to 2.05, b has a value from 0.0005 to 0.1, and a+b has a value of 1.91 to 2.06;
  (B) 1 to 60 weight parts fumed silica with a specific surface area of at least 50 m$^2$/g;
  (C) 1 to 200 weight parts surface-treated zinc carbonate powder as afforded by treating the surface of
    (a) zinc carbonate powder with
    (b) an organosilicon compound selected from the group consisting of organosilanes, organosilazanes, organosiloxane oligomers, and mixtures of the preceding;
  (D) a polyorganohydrogensiloxane comprising at least 2 silicon-bonded hydrogen atoms in each molecule, in a quantity that affords a value from 0.5:1 to 20:1 for the ratio of the number of moles of silicon-bonded hydrogen to the number of moles of silicon-bonded aliphatically unsaturated hydrocarbon groups in component (A);

(E) platinum catalyst in a catalytic quantity; and
(F) 1 to 200 weight parts surface-treated aluminum hydroxide powder as afforded by treating the surface of
  (c) aluminum hydroxide powder with
  (b) an organosilicon compound selected from the group consisting of organosilanes, organosilazanes, organosiloxane oligomers, and mixtures of the preceding.

3. A liquid silicone rubber composition comprising
(A) 100 weight parts polyorganosiloxane having a viscosity at 25° C. of from 100 to 100,000 mPa·s and average unit formula

$R^1_a R^2_b SiO_{4-a-b/2}$ where $R^1$ represents monovalent hydrocarbon groups that are free of aliphatically unsaturated bonding, $R^2$ represents aliphatically unsaturated hydrocarbon groups, a has a value from 1.90 to 2.05, b has a value from 0.0005 to 0.1, and a+b has a value of 1.91 to 2.06;
(B) 1 to 60 weight parts fumed silica with a specific surface area of at least 50 m²/g;
(C) 1 to 200 weight parts surface-treated zinc carbonate powder as afforded by treating the surface of
  (a) zinc carbonate powder with
  (b) an organosilicon compound selected from the group consisting of organosilanes, organosilazanes, organosiloxane oligomers, and mixtures of the preceding;
(D) a polyorganohydrogensiloxane comprising at least 2 silicon-bonded hydrogen atoms in each molecule, in a quantity that affords a value from 0.5:1 to 20:1 for the ratio of the number of moles of silicon-bonded hydrogen to the number of moles of silicon-bonded aliphatically unsaturated hydrocarbon groups in component (A);
(E) platinum catalyst in a catalytic quantity;
(G) 0.001 to 1 weight part triazole compound; and
(H) the reaction mixture of
  (d) a platinum compound and
  (e) 3,5-dimethyl-1-hexyn-3-ol, at 1 to 1,000 weight parts as platinum metal for each 1,000,000 weight parts component (A).

4. A liquid silicone rubber composition comprising
(A) 100 weight parts polyorganosiloxane having a viscosity at 25° C. of from 100 to 100,000 mPa·s and average unit formula

$R^1_a R^2_b SiO_{4-a-b/2}$ where $R^1$ represents monovalent hydrocarbon groups that are free of aliphatically unsaturated bonding, $R^2$ represents aliphatically unsaturated hydrocarbon groups, a has a value from 1.90 to 2.05, b has a value from 0.0005 to 0.1, and a+b has a value of 1.91 to 2.06;
(B) 1 to 60 weight parts fumed silica with a specific surface area of at least 50 m²/g;
(C) 1 to 200 weight parts surface-treated zinc carbonate powder as afforded by treating the surface of
  (a) zinc carbonate powder with
  (b) organosilicon compound selected from the group consisting of organosilanes, organosilazanes, organosiloxane oligomers, and mixtures of the preceding;
(D) polyorganohydrogensiloxane comprising at least 2 silicon-bonded hydrogen atoms in each molecule, in a quantity that affords a value from 0.5:1 to 20:1 for the ratio of the number of moles of silicon-bonded hydrogen to the number of moles of silicon-bonded aliphatically unsaturated hydrocarbon groups in component (A);
(E) platinum catalyst in a catalytic quantity;
(F) 1 to 200 weight parts surface-treated aluminum hydroxide powder as afforded by treating the surface of
  (c) aluminum hydroxide powder with
  (b) an organosilicon compound selected from the group consisting of organosilanes, organosilazanes, organosiloxane oligomers, and mixtures of the preceding;
(G) 0.001 to 1 weight part triazole compound; and
(H) the reaction mixture of
  (d) a platinum compound and
  (e) 3,5-dimethyl-1-hexyn-3-ol, at 1 to 1,000 weight parts as platinum metal for each 1,000,000 weight parts component (A).

5. A liquid silicone rubber composition according to claim 1, where component (b) is hexamethyldisilazane.

6. A liquid silicone rubber composition according to claim 2, where component (b) is hexamethyldisilazane.

7. A liquid silicone rubber composition according to claim 3, where component (b) is hexamethyldisilazane.

8. A liquid silicone rubber composition according to claim 4, where component (b) is hexamethyldisilazane.

9. A liquid silicone rubber composition according to claim 1, where component (b) is a hydroxyl-endblocked dimethylsiloxane oligomer.

10. A liquid silicone rubber composition according to claim 2, where component (b) is a hydroxyl-endblocked dimethylsiloxane oligomer.

11. A liquid silicone rubber composition according to claim 3, where component (b) is a hydroxyl-endblocked dimethylsiloxane oligomer.

12. A liquid silicone rubber composition according to claim 4, where component (b) is a hydroxyl-endblocked dimethylsiloxane oligomer.

13. A liquid silicone rubber composition according to claim 3, where component (G) is benzotriazole.

14. A liquid silicone rubber composition according to claim 4, where component (G) is benzotriazole.

15. A liquid silicone rubber composition according to claim 3, where component (d) is chloroplatinic acid.

16. A liquid silicone rubber composition according to claim 4, where component (d) is chloroplatinic acid.

17. A liquid silicone rubber composition according to claim 3, where component (d) is a chloroplatinic acid/ divinyltetramethyldisiloxane complex.

18. A liquid silicone rubber composition according to claim 4, where component (d) is a chloroplatinic acid/ divinyltetramethyldisiloxane complex.

* * * * *